United States Patent
Schaltegger

Patent Number: 5,176,241
Date of Patent: Jan. 5, 1993

[54] HIGH SPEED STRAIGHT LINE WEIGHING SYSTEM

[76] Inventor: Herbert Schaltegger, 10 Schaghticoke Trail, New Milford, Conn. 06776

[21] Appl. No.: 745,923

[22] Filed: Aug. 16, 1991

[51] Int. Cl.⁵ .............................................. B65G 37/00
[52] U.S. Cl. ............................. 198/346.2; 198/468.2; 198/959
[58] Field of Search .............. 198/346.1, 346.2, 468.01, 198/468.2, 959; 177/1, 145; 141/1, 83, 167, 168, 170

[56] References Cited

U.S. PATENT DOCUMENTS

| | | | |
|---|---|---|---|
| 3,556,279 | 1/1971 | Cotter | 198/346.2 X |
| 3,844,401 | 10/1974 | Gerlovich | 198/346.2 |
| 4,625,775 | 12/1986 | Schaltegger | 141/83 |
| 4,657,054 | 4/1987 | Schaltegger | 141/1 |
| 4,753,275 | 6/1988 | Schaltegger | 141/1 |
| 4,768,600 | 9/1988 | Colvin et al. | 177/1 |
| 4,848,479 | 7/1989 | Schaltegger | 177/145 |
| 4,880,098 | 11/1989 | Kronseder | 198/346.2 |
| 4,901,808 | 2/1990 | Wu | 177/145 |

FOREIGN PATENT DOCUMENTS

0573417 9/1977 U.S.S.R. .......................... 198/346.2

Primary Examiner—Robert P. Olszewski
Assistant Examiner—Cheryl L. Gastineau
Attorney, Agent, or Firm—Harry Williams

[57] ABSTRACT

A high speed container placement machine in which stationary units consisting of one feeder guide, one load cell and one discharge guide are placed in a spaced-apart relationship along the side of a supply conveyer traveling at a constant speed and carrying at least one row of spaced apart containers. The feeder guides of a particular group of such units simultaneously pick up a plural number of containers from the supply conveyer and place them on their respective load cells. After processing, the discharge guides of the units simultaneously remove the processed containers from the load cells and place them back on the same conveyer again between the arriving containers. The guides are driven by a simple cam and cam-follower variable speed drive mechanism which prevents any unintended interference between the guides and any of the containers.

22 Claims, 7 Drawing Sheets

FIG_3

FIG_4

FIG_10

HIGH SPEED STRAIGHT LINE WEIGHING SYSTEM

BACKGROUND OF THE INVENTION

The present invention relates to methods and apparatus for for high speed container placement, particularly for the purpose of filling and/or weighing a plurality of containers in a continuous operation.

In previous systems, particularly those patented by the present inventor and described in the following U.S. Pat. Nos. 4,848,479; 4,753,275; 4,657,054 and 4,625,775 (the disclosures of which are incorporated by reference herein), systems were devised to handle container placement for either top-off filling, complete filling or check weighing. Such systems served to transfer, on the one hand, a plurality of containers between a supply or feed conveyer, via transfer devices on a turntable, to stationary receiving stations (i.e. weighing stations or load cells) and thence back again from the load cells to the supply conveyer, or, on the other hand, between a straight line conveyer directly to either one or two stationary receiving stations and from there to a separate or second discharge conveyer. In both the machines, as just described, sufficient size must be allowed for to allow the multiple containers to be transferred by movable transfer guides rotated by the turntable to the receiving stations and from the receiving stations back to the supply conveyer, in the case of the rotary machine, or to a separate discharge conveyer, in the case of the straight-line machine. In the case of the rotary machines, considerable space is taken up by the rotating turntable and the driving mechanisms for the transfer guides associated with the transfer devices on the turntable which transport the containers on their cycloidally curved paths to and from the load cells. In the case of the straight line machine, again considerable size and bulk are required to accommodate a discharge conveyer system separate from the feeder or supply conveyer as well as the stationary transfer guides that have to operate between the two conveyers. Also, the rest period allowed for processing the containers that is otherwise obtained in the rotary design is eliminated in the straight line machines, so that the weighing time will be very short (less than half of the cycling time of the 360 degree rotations of these transfer devices around their respective drive shafts). Since the speed of these constantly rotating transfer devices must be close to the speed of the conveyer at the moment of pick-up of a container, the cycling time for a 360 degree revolution is so short that the conveyer can only supply two containers at the most during the cycling time, which then necessarily limits these straight line machines to only two load cells, that is, two receiving or processing stations. Consequently, the containers in such machines can no longer be returned to the supply conveyer (as in the rotary machines) but must be placed on a separate conveyer running parallel to the supply conveyer on the opposite side of the transfer device from the supply conveyer. As a result of the aforementioned conditions in previously known straight line machines, their weighing or processing time is extremely short and their capacity limited, requiring, therefore, the addition of a second conveyer and additional related equipment for operating such a conveyer.

In each of the aforementioned cases interference between the moving transfer guide members and the containers they handle poses a serious problem. Such interference can occur at almost any time between the transfer members when they do not properly handle the containers, such as tipping over the container before it is grasped, or knocking over one container in attempting to grasp another. Attempts to eliminate such interference have been made in the past by using large planetary gear transmissions or geneva drives which serve to accelerate and decelerate the motion of the guide members along their curved paths to and from the receiving stations. But such known transmission gearing systems cannot accelerate or decelerate enough the guides just before or after they reach their momentary maximum speed and for that reason are insufficient in preventing the aforementioned interference. Other means must be used to reduce interference, such as running the supply conveyer at a speed which is greater than the momentary maximum speed of the transfer guides and, also, implementing greater articulation into the construction of the transfer guide grasping mechanisms.

There is a need, therefore, for a high speed weighing system that can overcome the limitations of restricted rest periods for the placement and processing of containers, as well as a need to overcome the requirement for an additional conveyer in known straight line machines. Also there is a need to overcome the aforementioned interference problem between the transfer guide members and the containers they are meant to handle during a continuous placement operation, without having recourse to complicated speed transmission devices, such as planetary gearing systems, and complicated and expensive transfer guide members. Also, there is a need generally for a high-speed straight line line weighing system which will operate with fewer parts than previous systems and which will afford a cost-saving, space-saving and time-saving operation than was previously available.

OBJECTS AND SUMMARY OF THE INVENTION

It is a primary purpose and principle object of the present invention to provide a a high-speed straight line weighing system which will address the above-mentioned needs and which will eliminate the aforementioned problem of interference between transfer guide members and the containers with which they cooperate in a simple and efficient manner.

In carrying out the above purpose, the present invention provides a straight-line weighing system in which a group of containers are simultaneously and continuously moved from a continuously moving supply conveyer to stationary receiving stations where they are processed or weighed in a free-standing condition and then moved back again on to the same supply conveyer after the group of containers have been processed.

A particular feature of the present invention is the provision of processing "units" which are stationary and are placed in a regularly spaced apart fashion along the side of a supply conveyer having a series of containers thereon ready to be processed. Each unit consists of a pair of transfer guides and a load cell, so that each unit processes individual containers, regardless of their shape, in a continuous operation of removing a container from the conveyer, placing it on the load cell, and, after a momentary time for processing (preferably check weighing or top-off filling; complete filling would require more time, of course), removing the processed container from the receiving station and placing it back on the same conveyer from whence it came.

Another feature of the present invention is to allow the containers to be processed at their respective receiving stations for any period of time, from a half a second to eight seconds or more. It should be understood that the amount of time allowed for processing as well as the output rate of the processed containers will determine the number of "units" required.

It is another feature of the invention to provide such units either in a single row along one side of the supply conveyer, or in a double row with the supply conveyer moving between the rows of the units. The containers themselves may form a single line on the conveyer or they can be arranged in two rows on the conveyer, each row being serviced by the nearest single row of units.

Still another feature of the present invention is to provide units as above described in which the three main components, feeder guide, discharge guide and load cell, are stationary, except for the circular motion of the guides about their stationary axes.

Yet another feature of the invention is the use of a single axis or shaft for two guides, that is, the feeder guide and the discharge guide. In this modification of the invention the two guide members are displaced about 180 degrees on the same shaft and rotate in unison in the same direction.

Still another feature of the invention is to have double shaft arrangement in which each guide member, the feeder guide and the discharge guide, are mounted on respective separate shafts and the two-shafts being driven by a common drive. In both arrangements the guides rotate simultaneously and in the same direction for a particular group of processing units.

Yet a further feature of the invention is the provision of a transmission system which rotates the guides so that they will come to a momentary stop every 180 degrees, while rotating in between these stops at any desirable momentary maximum speed. This transmission according to the invention can provide for high acceleration just before and high deceleration just after the guides reach their momentary maximum speed to thereby insure continuous operation without unintended interference. Also, this fluctuating or variable speed transmission is the sole means for eliminating unintended interference between the guide members and the containers; that is, the guides will rotate under the required conditions without creating any unintended interference between them and any container on the conveyer.

Still another feature of the invention is the provision of an indexing mechanism associated with the fluctuating or variable speed transmission system which allows one of the momentary stops of the guides to extend or be prolonged into a rest period during which the processing of the containers on the receiving stations takes place, the weighing operation, for example. Both the indexing mechanism and the speed transmission comprise a single drive mechanism for a given group of units, that is, for a group of simultaneously rotating guides and will rotate the guides without creating any interference between them and any container on the conveyer, as mentioned above.

Still another feature of the present invention is the provision of special feeder guides for facilitating the grasping of the containers by the guides from the conveyer, The feeder guides in particular "pull" the containers from the conveyer, and in so doing it is necessary to grasp the container. The guides, therefore, have articulated portions that pivot with respect to one another in order to simulate the opening and closing movement of a hand; that is, the guide member may comprise a thumb portion, a fingers portion and a palm portion. Cam rollers cooperating with a stationary cam operate the opening and closing of the thumb portion or the fingers portion, either in the feeder guide member or the discharge guide member or both.

In accordance with one embodiment of the present invention there is provided a conveyer which travels at a constant speed and which supports thereon a plurality of containers that can be round, square or irregularly shaped; the only requirement is that the containers be regularly spaced apart. The "units" as above described are placed along the conveyer on one or both sides of it, and each unit consists of one "feeder guide," one load cell and one "discharge guide." In single shaft units both guides are mounted on the same shaft, approximately in opposite directions. In two-shaft units they are mounted on separate shafts which rotate together in the same direction with both guides always pointed in the same direction. The feeder guides pick up their containers from the supply conveyer when they rotate through their 0 degree positions and place them on the load cells at their 90 degree positions. After weighing, the discharge guides remove them from the load cells and place them back on the same conveyer again between the arriving containers. To assure gentle handling of all the containers, the guides rotate at their 0 degree positions at a speed which is slightly below the speed of the container. When placing the containers on the load cells or removing them from the cells, the speed of the guides will be momentarily zero. As a result, all the guides will come to a momentary stop at their 90 degree and their 270 degree positions, and they will momentarily rotate at their maximum speeds when they pass through their 0 degree and 180 degree positions. This means that the guides rotate from stop to stop in cycles of 180 degrees. During the first 90 degrees of these half circles, they increase their speed very gradually, and during the next 90 degrees they decrease their speed in the same manner. After the release of the processed or weighed containers by the discharge guides, when these rotate through their 0 degree positions and while traveling at their momentary maximum speeds, they must reduce their speed rapidly to avoid interference between them and their released containers. In the same manner the feeder guides must rapidly increase their speed just before reaching their momentary maximum speed when picking up their containers as they pass through their 0 degree positions.

It is necessary that the guides perform each 360 degrees of rotation, during which time they exchange the containers on the load cells while the conveyer travels a distance equal to three times the spacing of its containers. After the completion of each 360 degree rotation, one of the momentary stops of the guides must be extended into a rest period for the guides, the duration of which depends upon the length of the weighing time and therefore the number of load cells used for a particular grouping.

Other object, features and advantages of the invention will become more fully apparent from the following detailed description of the preferred embodiment, the appended claims and the accompanying drawings.

DETAILED DESCRIPTION OF THE PREFERRED EMBODIMENTS

Figure 1:
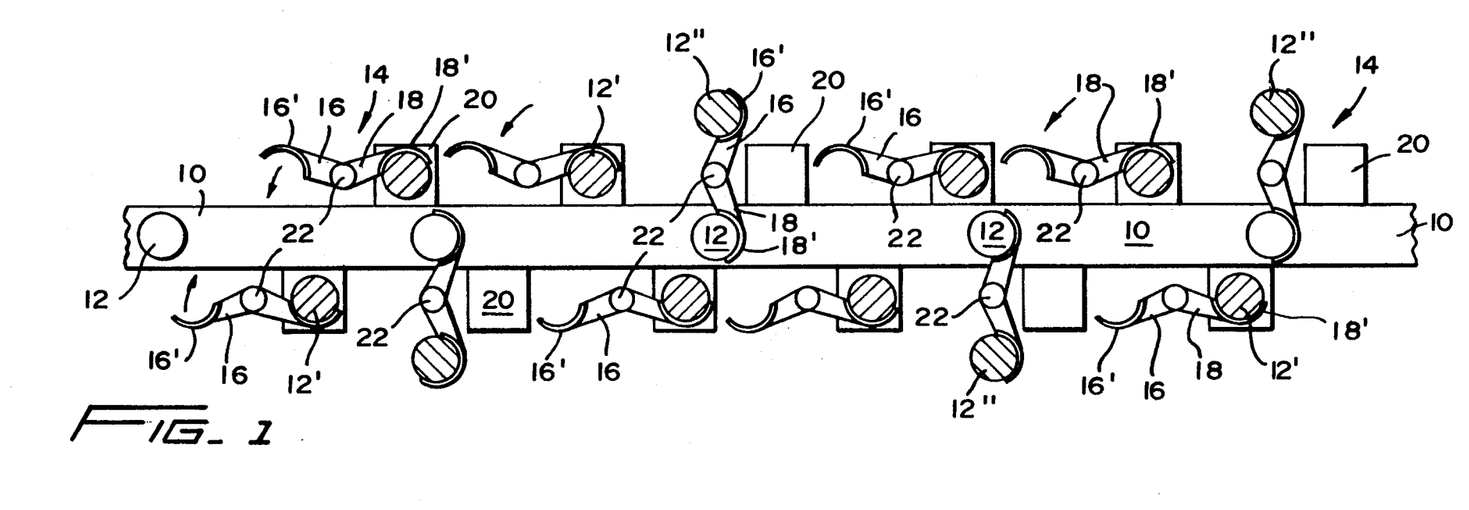
FIG. 1 is a schematic plan view of the container placement system according to the invention using a single shaft for the guides.

Referring now to FIG. 1, there is shown a conveyer 10 having disposed thereon a plural number of containers 12, equally spaced apart, and moving along with the conveyer at a constant speed, driven by suitable means to be discussed below. How the containers are supplied to the conveyer 10 is of no concern to the present invention. Spaced along the side of the conveyer 10 is a group of processing units 14, shown in various stages of receiving and discharging the containers 10. The exact relationship in terms of distances and angles between the positions of the containers and the various parts of the processing units and the conveyer itself will be described in detail in a table below. For the present, however, it will be seen that the containers 12 comprise empty containers as well as containers 12, which are in the state of being processed, and containers 12'' which have been through the processing stage. Processing is preferably in the form of the containers being weighed, although it is within the scope of the invention to have the containers not only check weighed but filled, or in the case of pre-filled containers, topped off. Each of these types of processing will demand a different number of processing units, and in the case of filling or top-off filling, the number of processing units comprising a group will depend on the size of the container, and the flow rate at which they are filled. For purposes of the present invention the processing step will be assumed to be one of check weighing the containers 12. While two groups of processing units are shown, one row on each side of the conveyer 10, it is well within the scope of the invention to have a single row of units 14 along one side of the conveyer; such a single-row system would operate at only half the speed of a double row system, as shown.

Each processing unit 14 shown in FIG. 1 comprises a feeder guide 16 having a container engaging hand portion 16' and a discharge guide 18 having a container engaging hand portion 18, and a load cell 20. The feeder guides and the discharge guides are seen to be disposed on a single shaft 22 approximately in opposite directions from each other.

Figure 2:
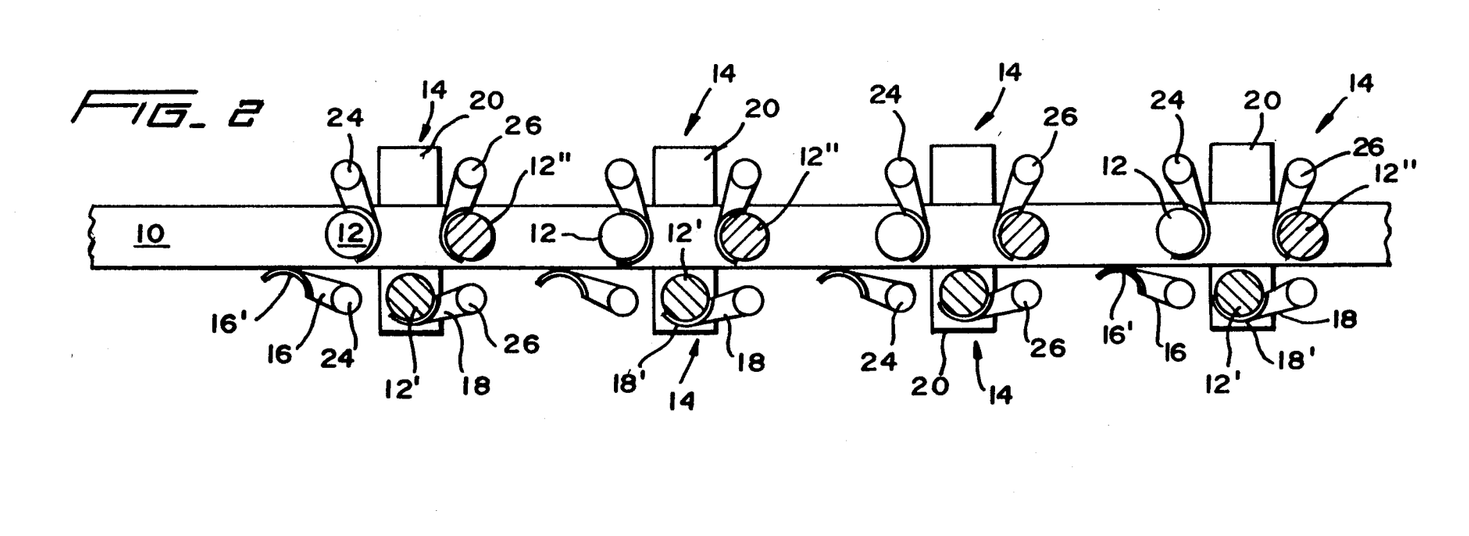
FIG. 2 is a schematic plan view of another embodiment of the container placement system using double shafts for the guides according to the invention.

In FIG. 2 a two-shaft system is shown in which the guides 16, 18 are mounted on separate shafts 24, 26 respectively, which rotate together in the same direction, with both guides always pointed in the same direction.

As will be explained more fully below, the feeder guides 16 pick up their containers from the conveyer when they rotate through their 0 degree positions and then place them on the receiving stations or load cells 20 at their 90 degree positions (see 12'). After weighing, the discharge guides 18 remove the weighed containers 12'' from the load cells 20 and place them back on the conveyer between the arriving containers. As will be explained more fully below, when placing the containers on the load cells 20 or starting their removal from the load cells 20, the speed of the guides 16 and 18 will be momentarily zero. By means of the the variable speed drive mechanism, to be more fully explained below (see FIGS. 6-10), all the guides will come to a momentary stop at their 90 degree and 270 degree positions (an indexing mechanism, also discussed below, provides for the prolongation of the momentary stops in order to allow processing of the containers), and they will momentarily rotate at their maximum speed when they pass through there 0 degree and 180 degree positions. This means that the guides rotate from stop to stop in 180 degree cycles. During the first 90 degrees of these respective half cycles, the guides will increase their speed, and during the next 90 degrees they will decrease their speed. As will be explained below the variable speed drive mechanism is provided for driving the guides in this manner in order to avoid interference between the guides and containers on the conveyer other than those intended to be moved by the guides. For this purpose the guides will be driven so as to accelerate their speed at a high rate just before they reach their 0 degree position and decelerate at an equally high rate just after they reach their 90 degree position. The guides of a particular group, such as all the guides shown in FIGS. 1 and 2, rotate simultaneously and in the same direction. The discharge guides 18 will place their weighed containers 12'' between the arriving ones.

When the feeder guides 16 in the single shaft units, such as shown in FIG. 1, pick up their containers, the discharge guides are at the 180 degree position; they have to rotate 180 degrees to be able to place their containers on the conveyer. During the time required by the guides to perform this rotation, the conveyer must travel the distance equal to one and half times the spacing of its containers (see table below). In the case of a two-shaft system, as shown in FIG. 2, the guides perform each 360 degree rotation, during which they exchange the containers on their load cells while the conveyer travels a distance equal to three times the spacing of its containers. The duration of the rest periods, above-mentioned, depends on the length of the weighing time and therefore on the number of load cells used in a group. The aforementioned conditions of operation require the following parameters:

The lowest allowable momentary maximum speed S2 is twice the average speed S1 of the guides, or $S1 = 2\pi R = 6.28R$ per 360 degree rotation of the guides, where R is the radius of the guides, that is, the radius of the circle defined by the rotating container about the shaft 22 or each of the shafts 24, 26, and where the momentary maximum speed of the guides is not less than $2 \times 6.28R = 12.56R$. The conveyer should travel slightly faster than the maximum speed of the guide of 12.56R, which is 13.8R per 360 degree rotation of the guides, and spacing of the containers on the conveyer is 13.8R divided by 3, which is 4.6R.

To keep the driving mechanisms for all the guides as simple as possible (see FIG. 10), it is preferable to rotate a number of guides at the same time. To achieve this condition it is necessary to space the processing units to match the spacing of the containers on the conveyer. As indicated above this spacing is 4.6R for guides with a momentary maximum speed of 2.0 times their average speed.

For those guides who max at 2.6 times their average speed (it being understood that the momentary maximum speed can be any chosen value, such as 2.0 or less or 2.6 or more), this spacing is 6.0R (by using the above calculations). The minimum spacing between single shaft processing units placed along a conveyer, such as shown in FIG. 1, is only 3.0R, while for two-shaft units it is 4.0R. Opening this spacing to 4.6R does not present much of a problem for machines which require only a few load cells, but for those which require more than a few, a wide spacing of units is required which increases the overall size of the machine. It is therefore desirable to arrange groups of simultaneously rotating guides which will permit a spacing of the units that can be smaller than the spacing of the containers on the conveyer, such as shown in FIG. 1. Three groups of simultaneously rotating guides are show in FIG. 1, for example, those guides rotating in one direction on one side of the conveyer and those guides rotating in the opposite direction on the other side of the conveyer, as well as the third group, those which are out of phase from the first two groups by approximately 90 degrees. In the FIG. 2 arrangement, two groups of simultaneously rotating guides are shown, those on one side of the conveyer and those on the other side of the conveyer. Other arrangements of groups are within the scope of the invention, namely, machines with only one group of units wherein all the guides rotate simultaneously, or machines in which four different groups of simultaneously rotating guides are used. In the last two cases—one group of simultaneously rotating guides and four such groups—the containers on the conveyer can travel in two parallel lines, with the containers spaced in each line the same as they would be for single line machines. In these cases the machines will run at half the speed of single line machines, and the guides will perform their 360 degree rotations in twice the time as the single line machines.

Figure 3:
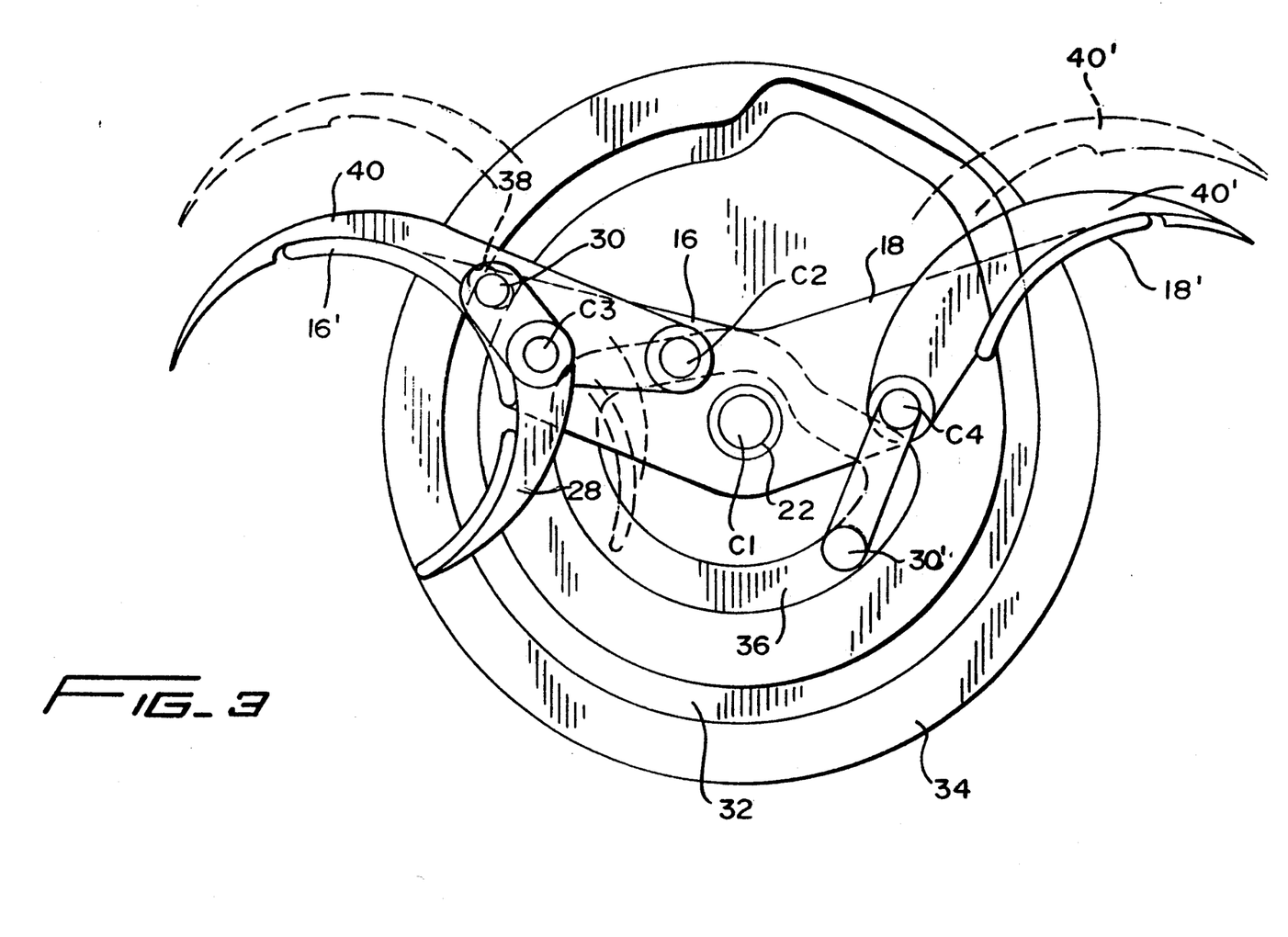
FIG. 3 is a schematic plan view of further details of a single shaft system for the guides.
Figure 4:
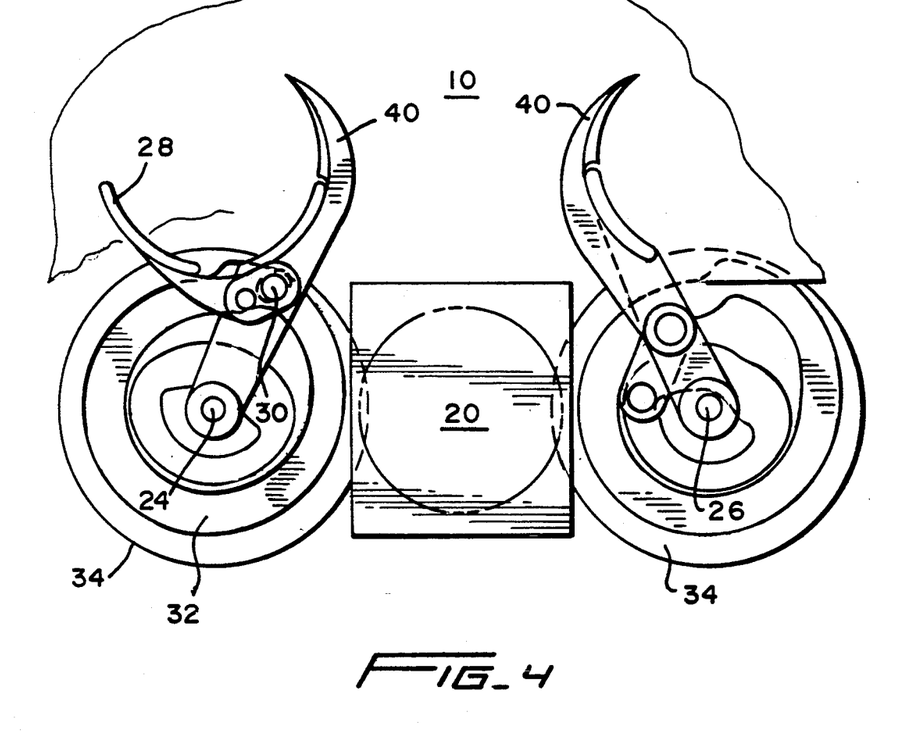
FIG. 4 is a schematic plan view of a two-shaft system for the guides.

Referring now to FIGS. 3 and 4, the guides themselves will be discussed in detail. The open hand of a feeder guide 16, catches an arriving container 12 on the conveyer 10 while rotating at its momentary maximum speed, which is slightly below the constant speed of the conveyer. This pick up occurs at near the position of these guides at 0 degrees. The feeder guides pull their containers while rapidly reducing their speed toward their respective load cell. After rotating 90 degrees from the moment of pick-up, they place their containers on the load cell.

Figure 3A:
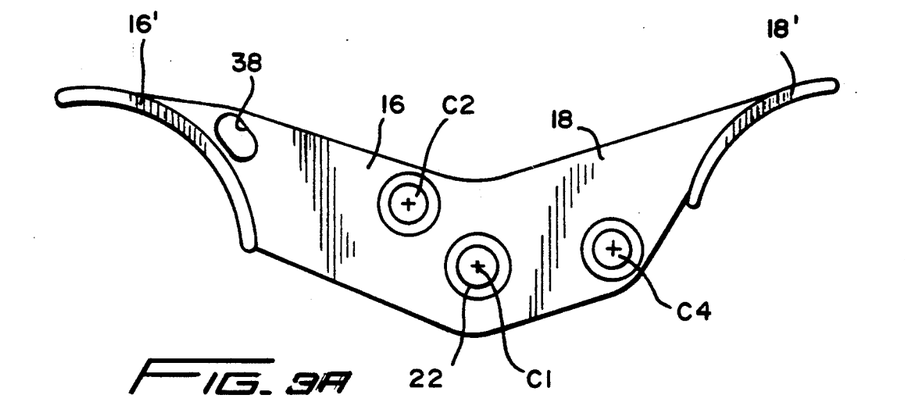
FIGS. 3A-3B are schematic plan views showing, respectively, the three separate parts that make up a single shaft guide member.
Figure 3B:
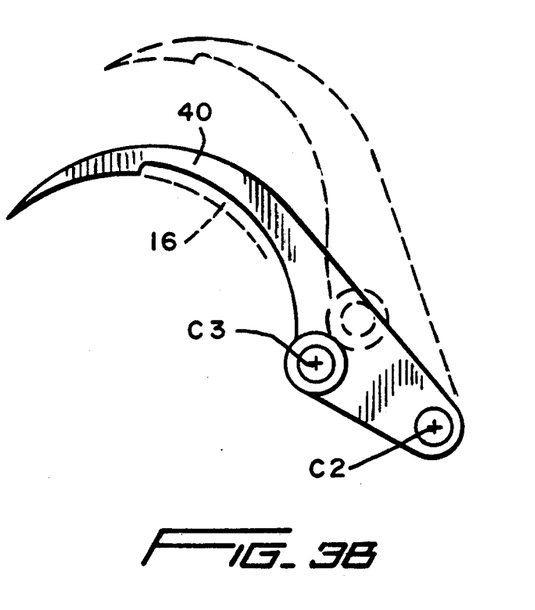
Figure 3C:
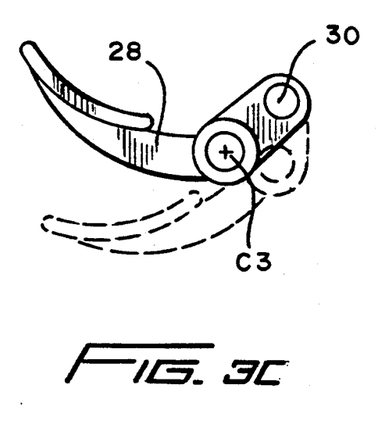
Figure 5:
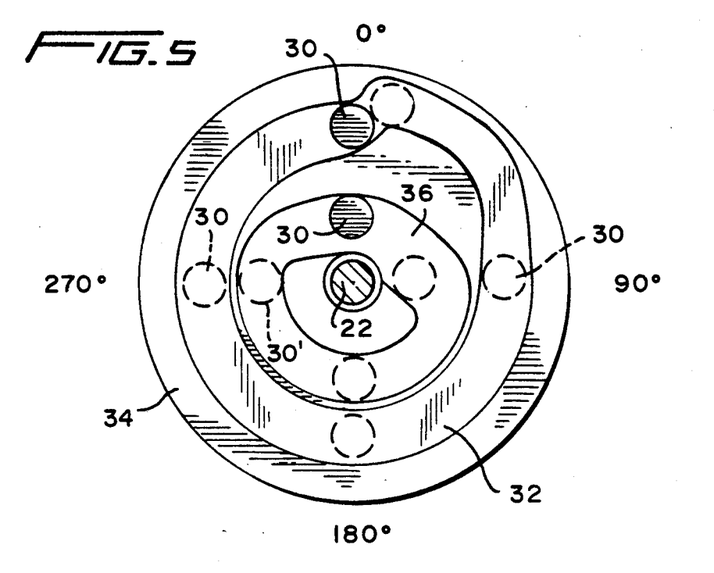
FIG. 5 is schematic plan view for the stationary cam used with the guides for operating the optional thumb and fingers portion thereof.

To be able to pull their containers, the feeder guides are equipped with a pivotal thumb 28 (see FIG. 3C) which can open and close and which holds the container in the hand 16' of the guide, thereby pulling the container over the load cell 20. As shown in FIGS. 3 and 5, the movement of the thumb 28 is controlled by a cam follower 30 which is connected to the thumb 28 by means of a suitable link (not shown); the cam roller 30 follows an outer groove 32 in a stationary cam 34 which surrounds the shaft 22 of the single shaft system (see FIG. 3). The thumb 28 is pivoted at C3 on a fingers element 40 (see FIGS. 3, 3B and 3C) which in turn is pivoted at C2 on the feeder guide 16 (see FIGS. 3A and 3B). The feeder guide 16 and the discharge guide 18 are constructed from a single piece of material (FIG. 3A) that forms the hand or palm portion 16', 18', respectively, of the single shaft guide. The feeder guide 16, the thumb 28 and the fingers element 40 together form a three-part member, the fingers element being pivoted, as shown, at C2 on the guide 16 and the thumb 28 being pivoted at C3 on the fingers element 40 and having one end thereof connected by a suitable link extending through a slot 38 in the feeder guide member 16 to the cam follower 30 which in turn rides in the outside groove 32 of the stationary cam 34. In this way when the guide 16 rotates, the cam follower 30 follows the outer groove 32 of the stationary cam (see FIGS. 3 and 5) and causes the thumb 28 to pivot to an open and closed position about its pivot C3 on the fingers element 40, which in turn causes the fingers element to pivot about its pivot C2 on the guide member 16, also to an open and a closed position during a 360 degree rotation of the feeder guide.

Because the discharge guide 1 pushes the container off the load cell 20, there is normally no need for a thumb means on it. But in those cases where an articulated fingers element might be desirable, as in the case of handling special containers having irregular shapes, a fingers arrangement 40' may be provided in the same manner as described above with respect to the feeder guides. Thus, the cam 34 is also seen to have an inner groove 36 provided for this purpose which cooperates with another cam follower 30' which is connected by a suitable link to one end of the pivotal fingers element 40', shown in FIG. 3, which is pivoted at C4 on the discharge guide 18. The pivotal fingers element 40' of the discharge guide may be desirable in order to avoid interference between the discharge guide and the containers after their placement on the conveyer.

In FIG. 4, a two-shaft system is shown, and the same stationary cam shown in FIG. 5 is also used with the two-shaft system. Only one stationary cam 34 would be required for surrounding each of the shafts 24 of the feeder guides 16 if the hand portions 18~ of the discharge guides 18 are to remain fixed. If it is desired, however, to provide an articulated or pivotal fingers element for the discharge guide, such as described with respect to the discharge guide of single shaft system above, then an additional stationary cam 34 would have to be provided for surrounding the shaft 26, as shown. The thumb and fingers elements in the two-shaft system shown in FIG. 4 are pivoted together according to the same principles as described above for the single shaft system.

The provision of articulated fingers to hold the containers, whether by pulling, in the case of the feeder guide, or pushing, in the case of the discharge guide, offers an additional means by which interference between the guides and the containers are prevented, especially in the case of non-uniformly shaped containers where the size and shape might offer a problem of interference between the the guides and the containers themselves.

Figure 6:
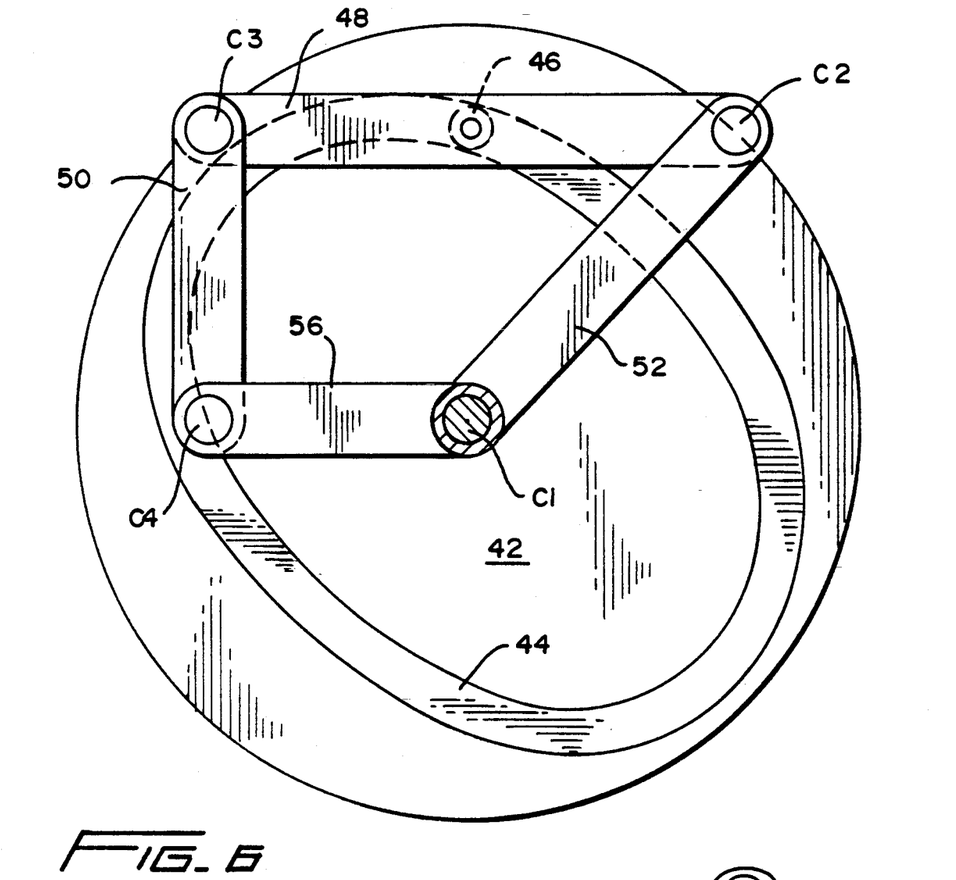
FIG. 6 is a schematic plan view of a stationary cam used with the variable speed drive transmission for the guides.
Figure 7:
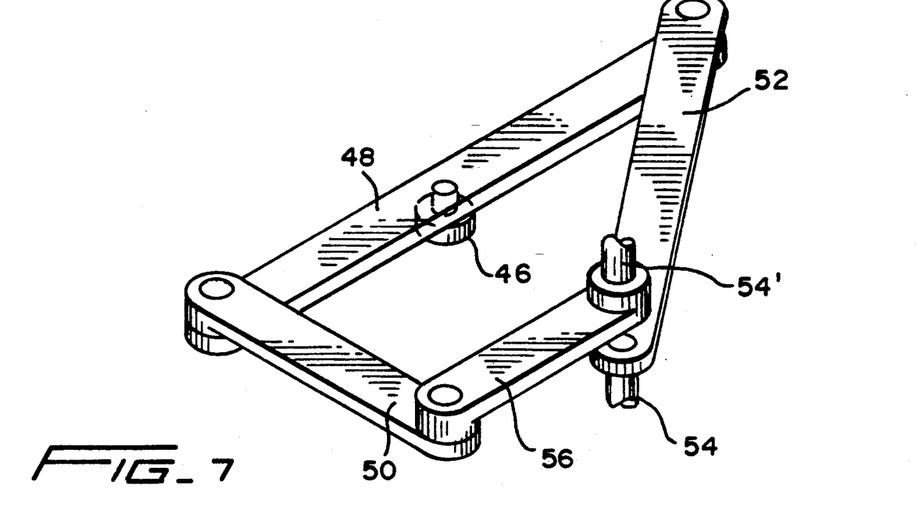
FIG. 7 is a schematic perspective of the linkage used with the stationary cam shown in FIG. 6.

However, it is the purpose of the invention to eliminate interference between the guides and the containers, especially uniformly shaped containers, on the conveyer solely by means of the variable speed drive mechanism for rotating the guides, so that the more simpler fixed fingers guides may be used with the invention. It has been discovered by the present inventor that interference between the guides and the containers can be completely eliminated by accelerating the guides just before they reach their 0 degree positions and decelerating their speed right afterwards at a rate which is higher than can be obtained by conventional methods, such as by planetary gearing and the like. To accomplish this purpose there is shown in FIGS. 6–10 a variable speed transmission mechanism comprising a stationary cam and cam follower mechanism that is simple in design and far less complex than known planetary gearing systems that might be used for attempting the same purpose. As shown in FIGS. 6 and 7, a stationary cam 42 is seen to have a groove 44 therein which guides a cam follower roller 46 which is rotatably supported by a connecting link 48 connected to a first drive lever 52 which is connected to a drive shaft 54 and a second connecting link 50 which is connected to a drive lever 56 which is connected to the output drive shaft 54', which in turn is connected via a suitable sprocket means to the shaft for the feeder guide in a two-shaft system or feeder and discharge guide in a single shaft system in a single group of such guides (see FIG. 11). The configuration of the groove 44 determines, of course, the speed at which the output shaft 54' rotates. The output shaft could be shaft 22 in a single shaft system (see FIG. 1). In either case, the output shaft shown will be the base shaft for driving by a suitable sprocket means (see below) all the other shafts of that group or a given group in which the guides of that group rotate simultaneously and in the same direction.

In the design shown in FIGS. 6 and 7, the first lever 52 is 4.0 inches long and the second lever 56 is 2 and ⅝ inches long. The connecting link or rod 48 is twice the length of the second lever 56. This arrangement, together with the configuration of the groove in the cam, will allow the guides to come to a momentary stop at 90 degrees and 270 degrees, and they will also rotate at any required momentary maximum speed at their 0 degree and 180 degree positions, including a high acceleration before and a high deceleration after the momentary maximum speeds of the guides.

Figure 8:
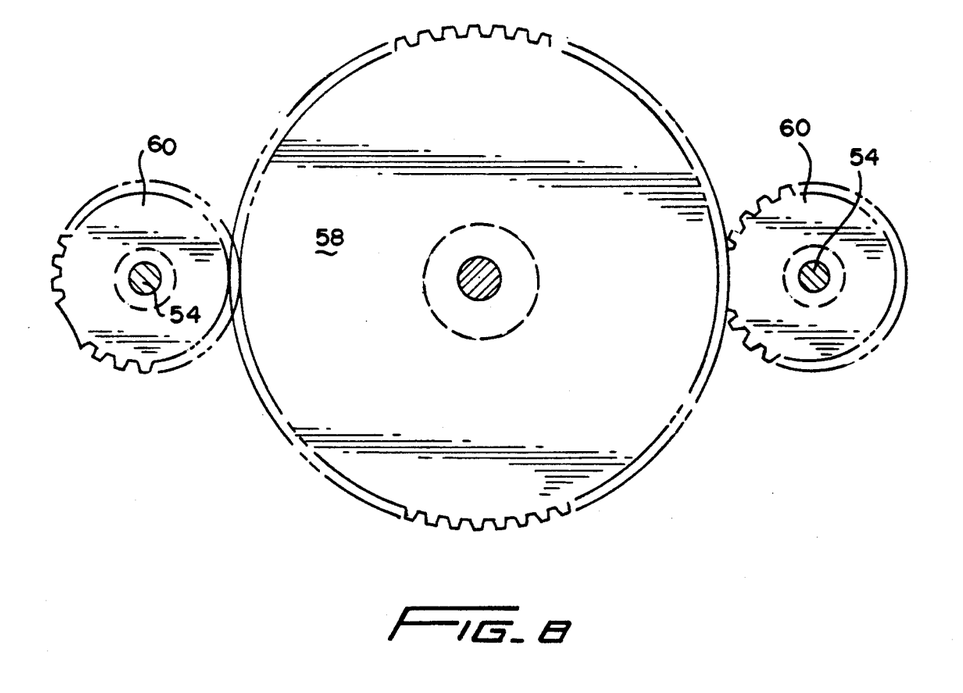
FIG. 8 is schematic plan view of the indexing mechanism and drive for the variable speed drive shown in FIG. 6.
Figure 9:
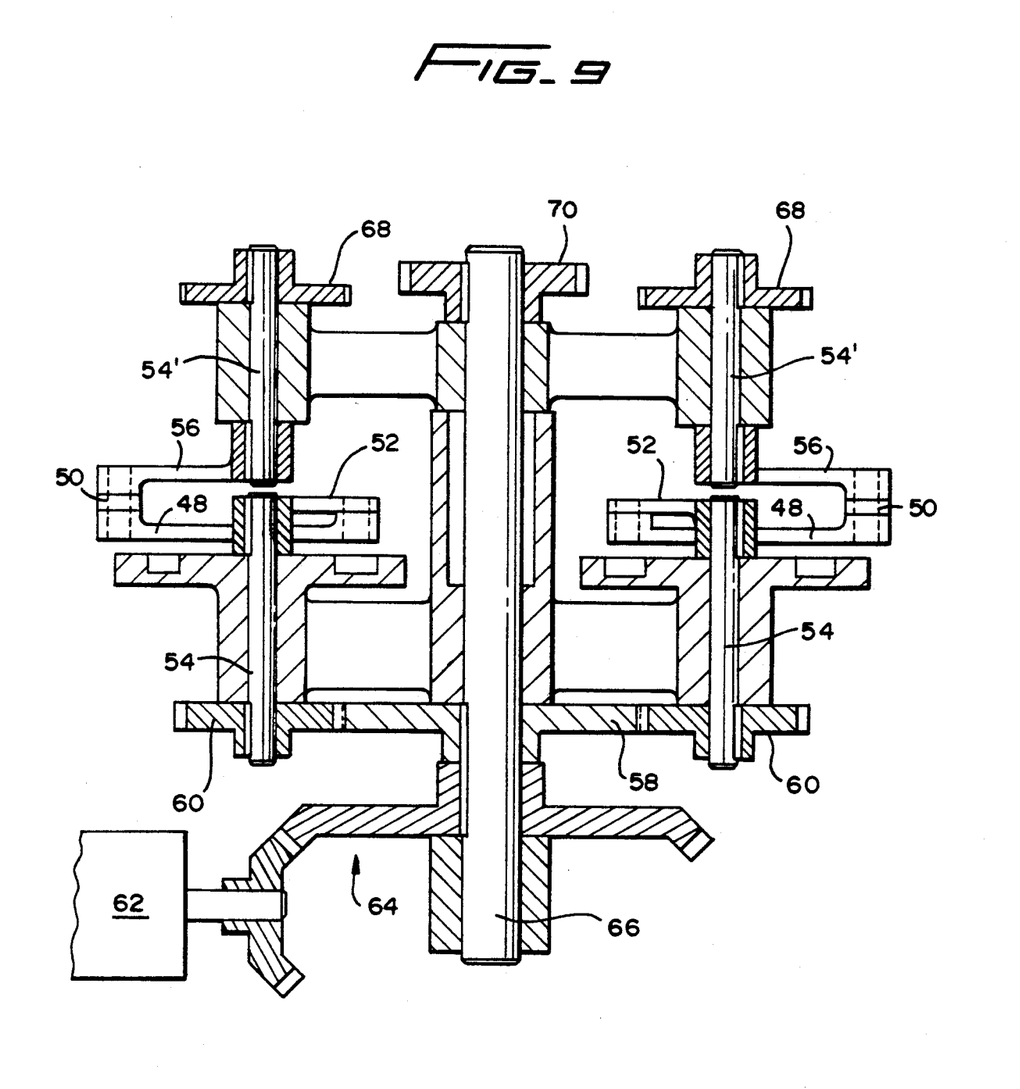
FIG. 9 is a schematic cross sectional view of the variable speed drive transmission and indexing mechanism shown in FIGS. 6-8.

For driving the drive shaft 54 at constant speed there is also provided an indexing mechanism shown in FIGS. 8 and 9, which serves to extend or prolong one of the momentary stops every 180 degrees experienced by the guides into a rest period of any required duration. Since the guides have to perform their 360 degree rotation during the time three containers (see table below) are passing by these guides, one of their two momentary stops has to be extended into the rest period. A large circular driving gear 58 drives two smaller planetary gear wheels 60 which are connected to their respective drive shafts 54 (see FIG. 8).

As shown in FIG. 9 the main drive gear 58 is driven at constant speed about the shaft 66 by the motor 62 though the agency of a beveled gear mechanism 64. The shafts 54 driven by the gear wheels 60 are seen to drive the first lever 52, as explained above.

It should be noted that where no rest periods are required for the guides, that is, in those cases where only three load cells or six load cells are used, there is no need for an indexing mechanism (see table below), and the stop portions shown on the gears 60 (see FIG. 8) would be eliminated, so that the gears 60 would be continuously driven by the main drive gear 58.

The driving mechanism for the guides, then, will include one indexing mechanism, as shown in FIG. 8, and one variable speed transmission mechanism as shown in FIGS. 6 and 7 for each group of simultaneously rotating guides and will rotate the guides without creating any interference between the guides and any container on the conveyer when a stationary cam is used with the groove shown in FIG. 6. Thus, the variable speed transmission mechanism according to the invention can rotate the guides at most any constantly changing speed and can include one or more slightly prolonged maximum speeds, as well as momentary or slightly prolonged stops and even very short reverse rotations. The driving wheel 58 is rotated continuously at a constant speed, as above described, and performs each 360 degree rotation during the time listed in the performance table below as "load cell cycle time." In the type of machine for which the table below refers to, this cycle time is 2 and ⅝ seconds for a machine with eight load cells and an output of 180 containers per minute. The cycle time for the guides during which they perform their 360 degree rotations is listed as one second. Their rest periods in between these rotations are 1 and ⅝ seconds. As a result of these conditions the ratio between the size of the drive wheel and 58 and the driven wheel 60 is 2 and ⅝:1. While the drive wheel 58 performs its 360 degree rotation during 2 and ⅝ seconds, the driven wheels 60, being 2 and ⅝ times smaller, perform their 360 degree rotation within 1 second. By design of these indexing devices, they come to a stop after each 360 degree rotation. In this case the stop will be for 1 and ⅝ seconds. The dwell time on the driving wheel 58 must be 62.5% of the rotating time of the driving wheel 58, so that the rotating time of the guides will be 0.375 times the total rotating time of the driving wheel 58.

Figure 10:
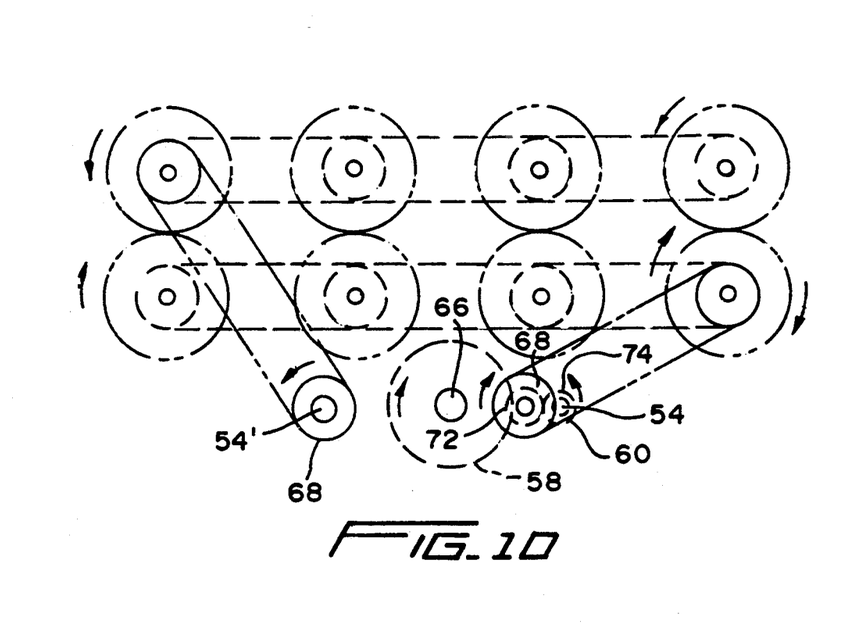
FIG. 10 is a schematic plan view of the variable speed drive mechanism and indexing mechanism used for driving two separate groups of processing units, one on each side of the conveyer.

FIG. 9 shows the indexing mechanism driving two variable speed transmission mechanisms, one for each group of guides connected respectively to two groups of rotating guides, as best shown in FIG. 10. The variable speed output shafts 54, are shown to be journaled to sprockets 68 which in turn, by means of a suitable chain drive or the like (shown in phantom in FIG. 10), drive the guides of a particular group of processing units, as best shown in FIG. 10. Also shown in FIG. 9 is a central sprocket 70 fixedly journaled to the drive shaft 66, which may be used for a suitable take-off feed for the conveyer drive timing screw (not shown).

Also shown in FIG. 10 is an additional gear 72 driven off a gear 74 provided on one of the output shafts 54' for reversing the angular direction of one of the output shafts 54' for one group of processing units, as shown, so that the guides of one group of processing units are driven in an opposite direction to those of the other group of processing units disposed on the opposite side of the conveyer.

The performance table below lists the data of the operating conditions of a particular machine, such as shown in FIG. 2, that is, the relationships between the weighing time and the number of load cells for a desired output of the machine.

Performance Table for straight-line conveyer weighing system shown in FIG. 2:

(For single or two-shaft processing units, to be placed on both sides of the conveyer wide enough to carry two separate rows of containers, one for each row of units--all guides rotate simultaneously (see FIG. 10):
All Units spaced 4.6R (minimum spacing is 3.0R for single shaft units and 4.0R for two-shaft units)
The guides rotate at the speed S2 of the lever 56 in the transmission shown in FIGS. 6 and 7
Operating specifications:

Average speed of guides (S1) = $2\pi R$ = 6.28R
Momentary minimum speed of guides (min S2) = 0
Momentary maximum speed of guides (max S2) = 2S1 = 12.56R
Rate of travel of conveyer (St) = 1.1 × 12.56R = 13.8R
Spacing of containers in either row on the conveyer (SpC) = 13.8R:3 = 4.6R
Spacing of containers in combined row = 4.6R:2 = 2.3R
Rotating time for guides = time for conveyer to travel the distance of 3 × SpC = time to place 3 containers each in both rows
Spacing of units (SpU) = SpC in each row of containers = 4.6R Machine Specifications:

| | | | | |
|---|---|---|---|---|
| Output of machine (cont. min.) | 180 | 180 | 180 | 180 |
| Output per row of containers | | | | |
| on conveyer/min | 90 | 90 | 90 | 90 |
| /sec | 1.5 | 1.5 | 1.5 | 1.5 |
| Number of load cells | 6 | 8 | 12 | 16 |
| in each row | 3 | 4 | 6 | 8 |
| Load cell cycles per min | 30 | 22.5 | 15 | 11.25 |
| Cycling time for load cells (sec) | 2 | 2.6 | 4 | 5.3 |
| Time to receive 3 containers in each row (sec) | 2 | 2 | 2 | 2 |
| Rotating time for guides (sec) | 2 | 2 | 2 | 2 |
| Rest periods for guides (sec) | 0 | 2/3 | 2 | 3.3 |
| Time lost on load cell during exchange of containers (sec) | 1 | 1 | 1 | 1 |
| Weighing time of containers (sec) | 1 | 1.6 | 3 | 4.3 |
| Radius of guides | 4" | 4" | 4" | 4" |
| Maximum dia. of containers | 3.5" | 3.5" | 3.5" | 3.5" |
| Spacing of containers on conveyer (SpC) | 18.4" | 18.4" | 18.4" | 18.4" |
| Spacing of units (SpU) | " | " | " | " |
| Travel of conveyer (/sec) | 27.6" | 27.6" | 27.6" | 27.6" |
| during rotating time of guides | 55.2" | 55.2" | 55.2" | 55.2" |
| during rest period | 0 | 18.4" | 55.2" | 92" |
| during load cell cycle time | 55.2" | 73.6" | 110.4" | 147.2" |
| Distance between first and last load cells (double row) | 3'10" | 5'4.4" | 8'5.2" | 11'6" |

The above table is one of many examples of tables that can be constructed for a given machine using the principles of the invention. For example, the type of machine to which the above table applies is one which uses two groups of processing units, such as shown in FIG. 2, so that the driving wheel must rotate two driven wheels, such as shown in FIG. 10. In this particular instance, each group of units begins to rotate 2⅔:2 = 1⅓ seconds from each other. The two driven wheels must therefore be located 180 degrees opposite each other on the driving wheel, as shown. As described above, each one of these driven wheels rotates one transmission, which in turn transfer the constant speed at which they are driven during their intermittent 360 degree rotations into the constantly variable speed of the guides, as above described.

In other types of machines, only one driven wheel may be required, whereas in still others three driven wheels may be required, and in some cases four driven wheels. The location of these wheels is determined by the starting time of the rotation of the guides in their respective groups. The foregoing relates to preferred exemplary embodiment of the present invention, it being understood that other embodiments and variants thereof are possible within the scope of the invention, the latter being defined by the appended claims.

What is claimed and desired to be secured by Letters Patent of the United States is:

1. A high speed container placement apparatus, comprising
a conveyer movable along a straight-line path at a constant speed,
plural containers disposed on said conveyer in a regularly spaced apart relationship,
at least one group of processing units disposed in a regularly spaced apart relationship along at least one straight-line path parallel to said conveyer,
each of said processing units including a guide means for engaging a container on said conveyer and having a stationary axis means about which said guide means rotate, and a stationary receiving means for receiving said container, and
variable speed drive means for said group of processing units for pivoting said guide means of said each processing unit of said group about their stationary axis means to thereby cause said guide means to engage a given number of containers on said conveyer and simultaneously move said containers respectively to said receiving means of said each of said processing units of said group and thereafter back to said conveyer.

2. A high speed container placement apparatus according to claim 1, wherein said guide means comprise a feeder guide means for feeding said containers to said receiving means of said processing units and a discharge guide means for discharging said containers from said receiving means back to said conveyer.

3. A high speed container placement apparatus according to claim 2, wherein said feeder guide means and said discharge guide means are mounted on the same axis of said stationary axis means, said feeder guide means comprising means defining a hand, the end portion of which is disposed generally at 180 degrees opposite to the end portion of said hand means of said discharge guide means.

4. A high speed container placement apparatus according to claim 2, wherein said feeder guide means and said discharge guide are mounted on separate and spaced apart axes of said stationary axis means, said feeder guide means and said discharge guide having respective means means defining a hand which extend generally parallel to each other.

5. A high speed container placement apparatus according to claim 2, wherein said at least one group of processing units extend along two straight-line paths paralleling said conveyer, said conveyer being disposed between said two straight-line paths.

6. A high speed container placement apparatus according to claim 1, wherein said variable speed drive means for said guide means of said group of processing units includes a stationary cam and cam follower means for driving said guide means to 1) arrive at momentary stops, 2) arrive at a momentary maximum speed during each half cycle of rotary travel of said guide means and 3) accelerate just before and decelerate just after said momentary maximum speed said guide means, whereby interference between said guide means and arbitrary ones of said containers on said conveyer is completely eliminated.

7. A high speed container placement apparatus according to claim 6, wherein said momentary maximum speed of said guide means is at least twice the average speed of said guide means and occurrence of said momentary maximum speed in said each half cycle of rotary travel of said guide means is at approximately 0 degrees and 180 degrees of their rotary travel.

8. A high speed container placement apparatus according to claim 6, wherein said variable speed drive means for said group of processing units further includes an indexing means for driving said variable speed driving means to thereby cause said guide means to prolong one of said momentary stops, whereby the duration of said one of said momentary stops allows a given number of said containers to be respectively and simultaneously processed at said group of processing units.

9. A high speed container placement apparatus according to claim 8, wherein the occurrence of said momentary stop of said guide means in said each half cycle of rotary travel of said guide means is at approximately 90 degrees and 270 degrees of their rotary travel.

10. A high speed container placement apparatus according to claim 8, wherein said indexing means includes a constant speed driving means for driving said indexing means, said indexing means being connected to a first lever of said variable drive means, said first lever being connected via linkage means to said cam follower, and said linkage means being connected to a second lever for driving said guide means about said stationary axis means.

11. A high speed container placement apparatus according to claim 2, wherein said feeder guide means comprise means defining a hand for engaging said containers, said feeder guide means having means defining a pivot, and a fingers means connected to said pivot means and extending beyond said hand means.

12. A high speed container placement apparatus according to claim 11, wherein said feeder guide means further comprises means defining a thumb pivoted to said fingers means, the pivotal movement of said fingers means and said thumb means being controlled by a stationary cam means surrounding said stationary axis means and cooperating with a cam follower means connected to said thumb means.

13. A high speed container placement apparatus according to claim 2, wherein said discharge guide means comprise means defining a hand for engaging said containers, said hand means having means defining fingers pivoted to said hand means, the pivotal movement of said fingers means being controlled by a stationary cam means surrounding said stationary axis means and cooperating with a cam follower means connected to said fingers means.

14. A high speed container placement apparatus, comprising
a conveyer movable along a straight-line path at a constant speed,
plural containers disposed on said conveyer in a regularly spaced apart relationship,
at least one group of processing units disposed in a regularly spaced apart relationship along at least one straight-line path parallel to said conveyer,
each of said processing units including a guide means for engaging a container on said conveyer and having a stationary axis means about which said guide means rotate, and a stationary receiving means for receiving said container, and
variable speed drive means for said guide means of said group of processing units for driving said guide means to 1) arrive at momentary stops, 2) arrive at a momentary maximum speed during each half cycle of rotary travel of said guide means and 3) accelerate just before and decelerate just after said momentary maximum speed said guide means, whereby a given number of said containers are simultaneously moved by said guide means for said group of processing units from said conveyer to said receiving means for said group of processing units and back again to said conveyer.

15. A high speed container placement apparatus according to claim 14, wherein said momentary maximum speed of said guide means is at least twice the average speed of said guide means and occurrence of said momentary maximum speed in said each half cycle of rotary travel of said guide means is at approximately 0 degrees and 180 degrees of their rotary travel, and the occurrence of said momentary stops of said guide means is at approximately 90 degrees and 270 degrees of their rotary travel.

16. A high speed container placement apparatus according to claim 14, wherein said variable speed drive means for said group of processing units further includes an indexing means for driving said variable speed driving means to thereby cause one of said momentary stops of said guide means to be extended into a prolonged stop, whereby the duration of said prolonged stop allows a given number of said containers to be respectively and simultaneously processed at said group of processing units.

17. A high speed container placement apparatus according to claim 14, wherein said indexing means includes a constant speed driving means for driving said indexing means.

18. A high speed container placement apparatus according to claim 1, wherein the spacing between said processing units along said conveyer is greater than the spacing between said containers on said conveyer.

19. A high speed container placement apparatus according to claim 1, wherein the spacing between said processing units along said conveyer is smaller than the spacing between said containers on said conveyer.

20. A high speed container placement apparatus according to claim 1, wherein the spacing between said processing units along said conveyer is the same as the spacing between said containers on said conveyer.

21. A method of high speed placement of containers, comprising the steps of
transporting a plural number of containers continuously at a constant speed on a straight-line conveyer in a regularly spaced apart relationship,
transferring simultaneously at least one group of said containers in respective circular paths about respective stationary axe to spaced apart stationary processing stations parallel to said conveyer,
maintaining said group of containers at said processing stations for a given period of time in order to process said containers, and
transferring simultaneously said group of containers in respective circular paths about respective stationary axes back to said conveyer after the elapse of said given period of time for processing said group of containers at said processing stations.

22. A high speed container placement method according to claim 21, comprising the further step of moving said group of containers at a momentary maximum speed during each half cycle of rotary travel in said respective circular paths, and accelerating said group of containers just before and decelerating said group of containers just after said momentary maximum speed is achieved.

* * * * *